United States Patent [19]

Tortola et al.

[11] Patent Number: 4,998,271
[45] Date of Patent: Mar. 5, 1991

[54] TELEPHONE ACCESSORY

[75] Inventors: Angelo Tortola, Lexington; Donald C. Miffitt, Chelmsford; Charles S. Sebor, Reading, all of Mass.

[73] Assignee: Venture Technologies, Inc., North Billerica, Mass.

[21] Appl. No.: 399,230

[22] Filed: Aug. 28, 1989

[51] Int. Cl.⁵ ............................................. H04M 1/00
[52] U.S. Cl. ...................................... 379/32; 379/61; 379/377
[58] Field of Search ...................... 379/61, 32, 33, 377

[56] References Cited

U.S. PATENT DOCUMENTS

| | | |
|---|---|---|
| 3,883,702 | 5/1975 | Zarouni . |
| 4,230,914 | 10/1980 | Korwin . |
| 4,258,625 | 3/1981 | Walton . |
| 4,273,960 | 6/1981 | Fahey . |
| 4,390,750 | 6/1983 | Bartelink . |
| 4,392,023 | 7/1983 | Sears ................................... 379/377 |
| 4,510,350 | 4/1985 | Wagner . |
| 4,521,643 | 6/1985 | Dupuis . |
| 4,555,057 | 11/1985 | Foster ..................... 236/94 |
| 4,664,109 | 2/1987 | Takeda ................................. 379/27 |
| 4,682,348 | 7/1987 | Dawson ............................. 379/414 |
| 4,686,697 | 8/1987 | Shapiro ............................... 379/38 |
| 4,712,097 | 12/1987 | Hashimoto .......................... 379/48 |
| 4,712,230 | 12/1987 | Rice .................................... 379/112 |
| 4,741,022 | 4/1988 | Chebra .............................. 379/106 |
| 4,748,654 | 5/1988 | Gray .................................... 379/40 |
| 4,791,658 | 12/1988 | Simon ................................. 379/41 |
| 4,805,210 | 2/1989 | Griffith .............................. 379/195 |

Primary Examiner—Stafford D. Schreyer
Attorney, Agent, or Firm—Choate, Hall & Stewart

[57] ABSTRACT

An apparatus for use with a telephone including, in one embodiment, a detector for detecting when the telephone is in an off-hook condition and disconnect circuit for eliminating the off-hook condition when the off-hook condition is caused by the telephone so that phone calls may be received by the line. An alarm responsive to the detector produces a warning of the off-hook condition if another phone on the line is off hook.

27 Claims, 5 Drawing Sheets

TELEPHONE ACCESSORY

This invention relates to accessories that indicate whether a telephone is off-hook.

BACKGROUND OF THE INVENTION

When a telephone is off the hook, access to the phone by outside callers is generally prevented. In most phone systems, after the phone has been off-hook for a period of time and inactive, the phone company typically sends a warning signal that can be heard through the receiver.

Shapiro, U.S. Pat. No. 4,686,697, discloses a telephone checking system which generates and detects an off-hook load to test the condition of telephone lines. A microprocessor system periodically seizes a line and causes the system to go off hook. If the off hook load is detected by the microprocessor control system over a line, the telephone is assumed to be in good status. Thereafter, the phone is returned to normal operation. If, however, the off hook load is not detected, the microprocessor control system generates a bad line signal that is used to cause an LED pilot light to blink.

Bartelink, U.S. Pat. No. 4,390,750, discloses a remote supervisory system in which sensors are coupled to a subscriber s telephone circuit. If an abnormal condition occurs, the condition is sensed by one of the sensors and the equipment creates a temporary off-hook condition on the circuit, transmits alarm report signals indicative of the abnormality to a central office and then goes back on-hook.

Fahey, U.S. Pat. No. 4,273,960, discloses an apparatus for monitoring usage of a telephone which is connected across tip and ring terminals of the telephone system. The circuitry, under microprocessor control, repetitively samples the voltage across the tip and ring terminals to identify the transitions between on-hook and off-hook. For each detected transition an activity timer within the microprocessor counts the time period until the next transition. In the event the activity timer times out, an alarm condition is produced.

Korwin, U.S. Pat. No. 4,230,914, discloses a telephone intruder alarm system which indicates to an on-line user of a primary extension telephone, a subsequent connection and disconnection of another, auxiliary extension telephone within the same telephone line. Electrical off- and on-hook signals are generated each time an extension telephone is interconnected or disconnected. Such signals are detected and used to illuminate a light emitting diode thereby indicating when another phone has been taken off-hook.

SUMMARY OF THE INVENTION

The invention is an apparatus and method for use with a telephone connected to a phone system.

In one aspect, the invention includes a detector for detecting when an off-hook condition exists on the phone line, and a disconnect circuit responsive to the off-hook detector for eliminating the off-hook condition when the off-hook condition is caused by the telephone.

Preferred embodiments include the following features. When the telephone is off-hook, it adds a load to the phone line thereby causing the off-hook condition The off-hook detector detects the presence of the added load on the phone line by monitoring a line voltage across the phone line. To electrically disconnect the telephone, the disconnect circuit disconnects the load from the phone line. The disconnect circuit also includes a line activity detector for detecting when the phone line is in an inactive off-hook condition. A phone system sends a warning signal over the phone line to indicate that the phone line had been in an inactive off-hook condition for a predetermined length of time and the line activity detector detects the warning signal. The warning signal includes a plurality of tones and the line activity detector operates by detecting one of said plurality of tones. The apparatus further includes a testing circuit for detecting when the telephone is in the on-hook state, and an override circuit responsive to the testing circuit for resetting the disconnect circuit when the telephone is placed back in the on-hook state. The apparatus also includes a ring monitor circuit for detecting an incoming call over the phone line while the phone is disconnected from the phone line.

In general, in another aspect, the invention is an apparatus for use with a telephone that is electrically connected to a phone line, there possibly being another telephone connected to the phone line. The apparatus includes an off-hook detector for detecting when an off-hook condition exists in the phone line; a line activity detector responsive to the off-hook detector for determining if the phone line experiencing the off-hook condition is inactive, and an alarm responsive to the line activity detector for indicating that the phone line is in an inactive off-hook condition.

In another aspect, the telephone is a cordless phone that is electrically connected to the phone line through a base station, the cordless phone having a talk mode that results in an off-hook condition on the phone line and a standby mode that does not result in an off-hook condition on the phone line. The off-hook detector detects that the off-hook condition exists on the phone line by detecting that the cordless phone is in the talk mode and the disconnect circuit eliminates the off-hook condition by placing the cordless phone in the standby mode.

An advantage of the invention is that it detects when the telephone is in an off-hook and inactive condition and then disconnects the phone from the system. Even though the phone has been disconnected, the invention warns the user of other incoming calls. If another phone is causing the off-hook condition, the invention alerts the user that another phone is off-hook and that incoming calls cannot be received.

Other features and advantages are included in the following description and attached claims.

DESCRIPTION OF THE PREFERRED EMBODIMENT

BRIEF DESCRIPTION OF THE DRAWINGS

We first briefly describe the drawings.

STRUCTURE AND OPERATION

Figure 1:
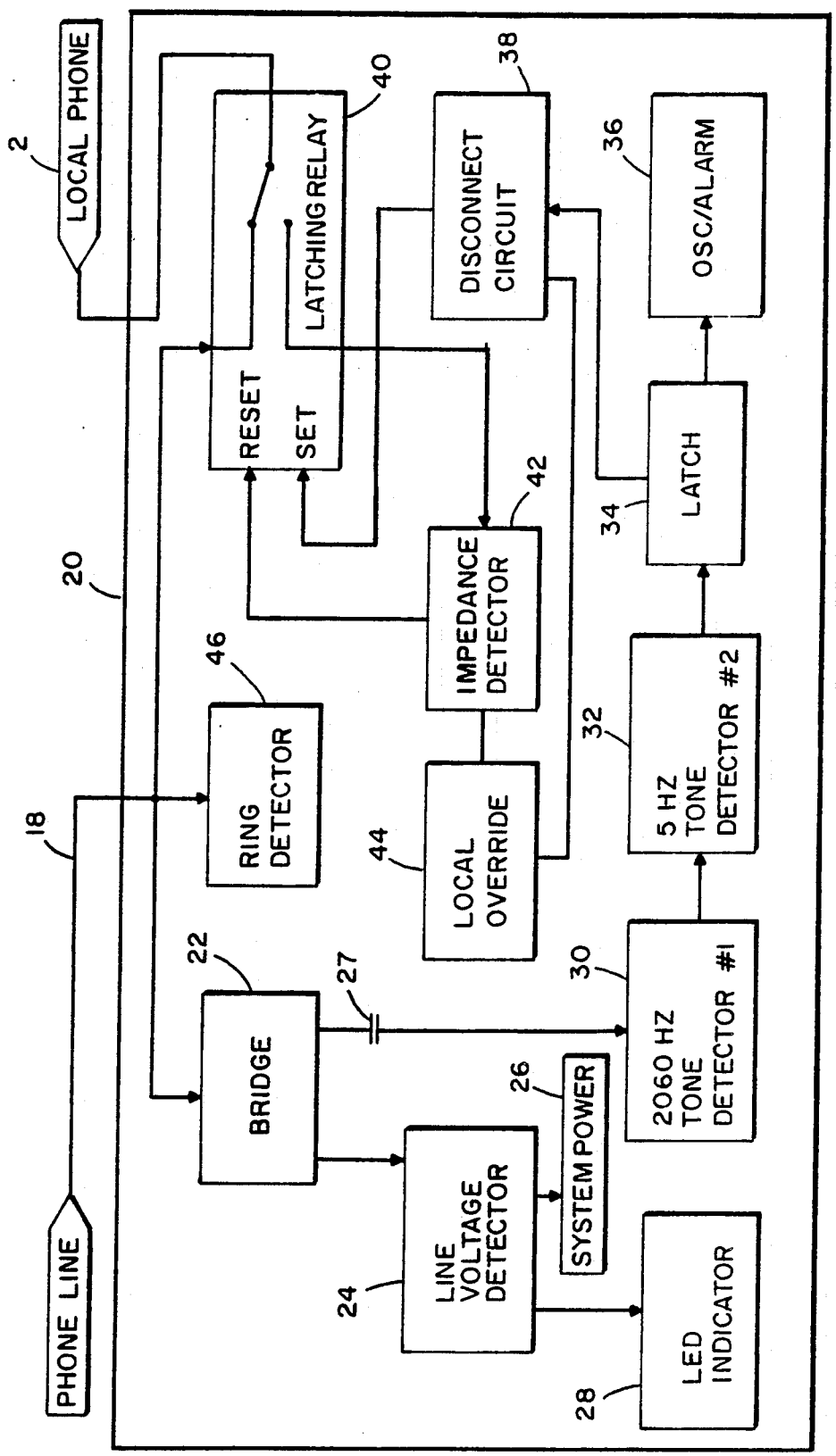
FIG. 1 is a block diagram of an embodiment of the invention.

FIG. 1 illustrates an off-hook detector module 20 which electrically connects a local phone 2 to a phone line 18. In module 20, a bridge and protection circuit 22 (referred to as bridge circuit 22), a ring detector 46 and a latching relay 40 are each connected to phone line 18. Bridge circuit 22 includes a diode bridge which assures proper line polarity even if local phone had been connected incorrectly and it includes a metal oxide varistor which provides protection against voltage surges such as might be caused by lightening. Ring detector 46, which is built from Texas Instrument part no. TI1506, detects incoming calls over phone line 18 and sends an audible signal alerting the user that a call is being made to local phone 2. Latching relay 40 has two states, namely, a reset state in which local phone 2 is electrical connected to phone line 18 and a set state in which local phone 2 is disconnected from phone line 18 and connected to other circuitry within module 20, namely, an impedance detector 42 which is in turn connected to a local override circuit 44.

A line voltage detector 24 is connected to bridge circuit 22. Line voltage detector 24 monitors the DC voltage level of phone 18 to determine when any phone that is connected to phone 18 (including local phone 2) is taken off hook. Typically, when local phone 2 is electrically connected to phone line 18 and is on hook, the voltage of phone line 18 is about 48 volts and when local phone 2 is taken off hook, the voltage drops to about 10 volts. When line voltage detector 24, which is directly connected to a power source 26 for module 20, senses a voltage on phone line 18 of less than a threshold of 20 volts, (referred to as an off-hook condition) it turns on an LED indicator 28 to indicate that a phone on line 18 is in an off-hook state. Line voltage detector 24 also powers up other components in module 20, including a tone detector 30, a frequency detector 32, a latch circuit 34, an alarm circuit 36, a disconnect circuit 38, and local override circuit 44, each of which will be described below. When the voltage on phone line 18 returns to 48 volts, indicating that it is no longer loaded and in an off-hook condition, line voltage detector 24 turns off indicator 28 and the other identified components.

Generally, when local phone 2 has been left off hook and inactive for a sufficiently long time (i.e., in an off-hook condition and an inactive condition), the phone company sends a warning signal over phone line 18 consisting of multiple tones (e.g. 1400 Hz, 2060 Hz and 2600 Hz) that are modulated on and off at a 5 Hz rate. Tone detector 30, which is capacitively coupled (through capacitor 27) to bridge circuit 22, detects the presence of this warning signal on phone line 18. Tone detector 30 is made from a commercially available phase locked loop device (such as EXAR Corp. part no. XR 2211 or XR 567) with the appropriate filter circuitry so that it detects a 2060 Hz signal. In response to receiving the warning signal sent by the phone company, tone detector 30 outputs a modulated indication signal. The modulated indication signal switches between one polarity when the 2060 Hz tone is present and an opposite polarity when the 2060 Hz tone is not present. Since the tones in the warning signal are modulated at 5 Hz, modulated indication signal also has frequency of 5 Hz.

Figure 2:
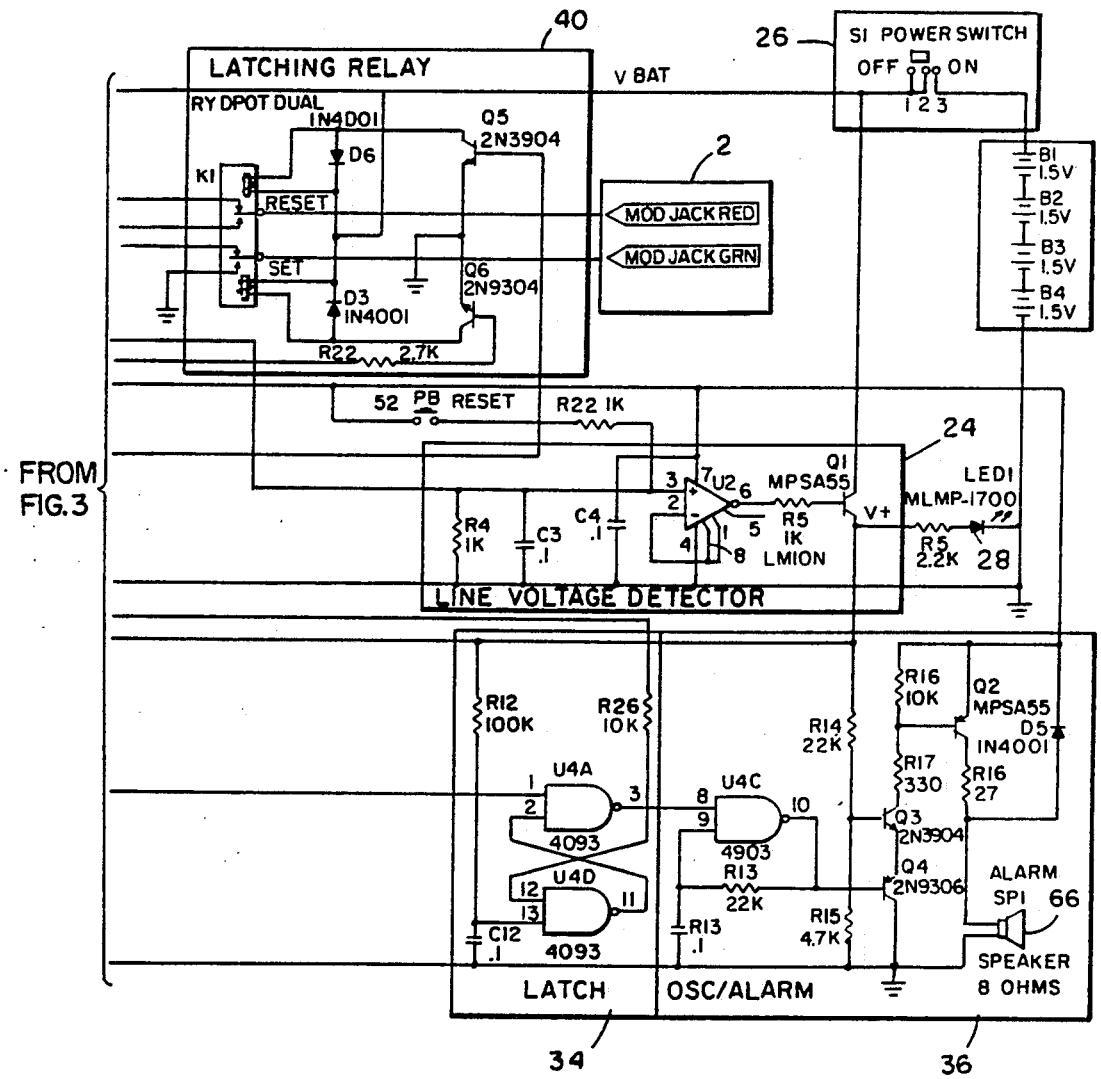
FIG. 2 is a circuit diagram for the embodiment shown in FIG. 1.
Figure 2:
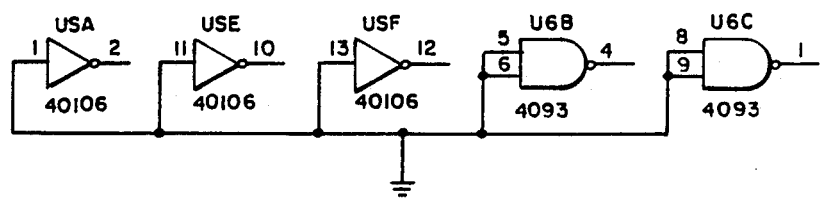
Figure 2:
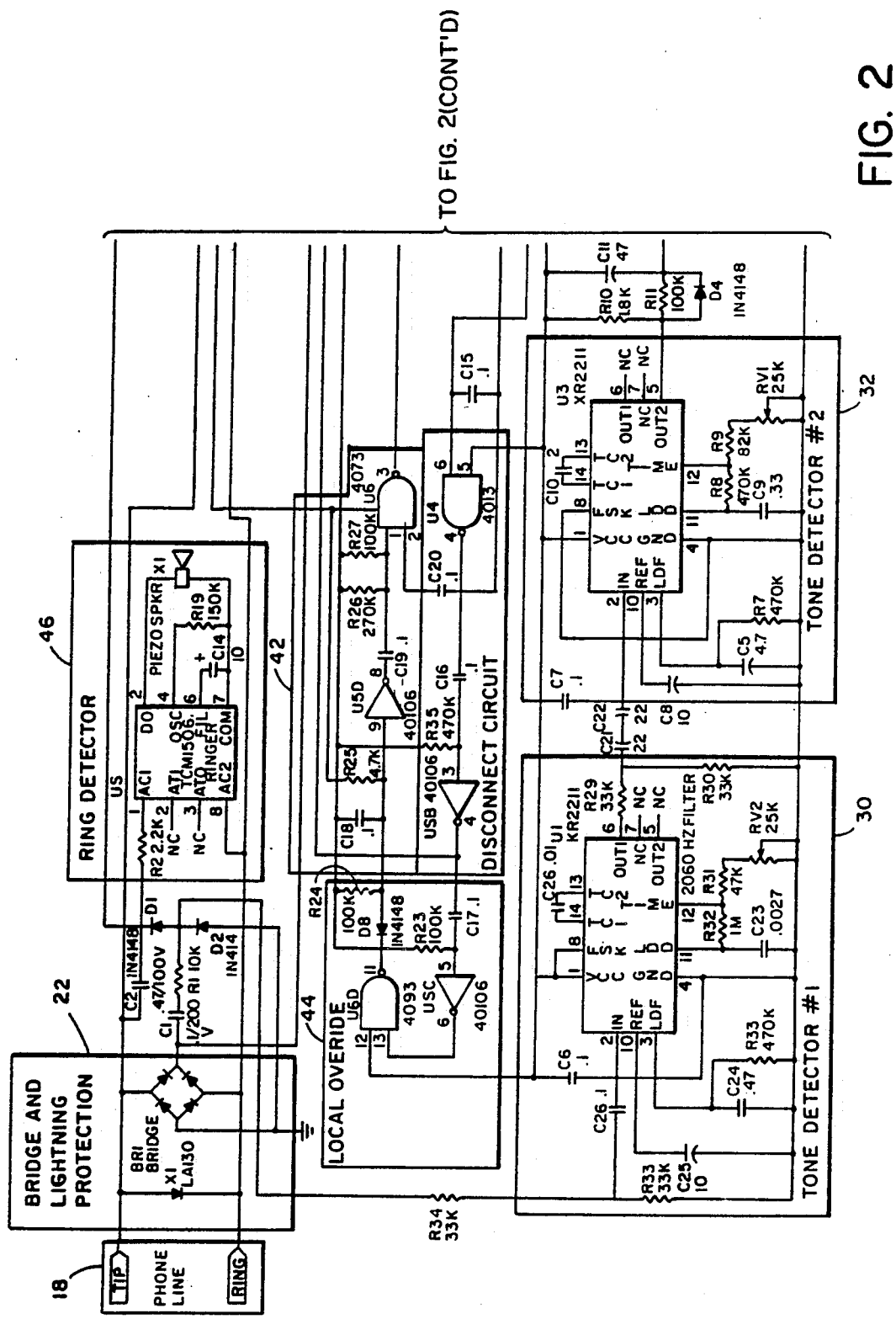

Frequency detector 32, receives the modulated indication signal. Frequency detector 32 is also made from a commercially available phase locked loop device and is tuned to detect 5 Hz signals. When the modulated indication signal is present, frequency detector 32 sets latch circuit 34. When set, latch circuit 34 turns on alarm circuit 36 and activates disconnect circuit 38. Alarm circuit 34 generates an audible alarm through a speaker 66 (FIG. 2) to alert the user that a phone is in an off-hook condition. It may also produce a visual indication.

Disconnect circuit 38, using a Schmitt trigger, responds to the signal from latch circuit 34 and sets latching relay 48 thereby electrically disconnecting local phone 2 from phone line 18 and connecting it to impedence detector 42 and local override circuit 44. Impedance detector 42 monitors the load caused by local 2 and senses when local phone 2 is placed back on hook by detecting a decrease in load that exceeds a preselected amount. When impedance detector 42 detects that local phone 2 has been placed back on hook, it resets latch relay 48, thereby reconnecting local phone 2 to phone line 18. This also causes the voltage on phone line 18 to rise back to 48 volts which in turn causes line voltage detector 24 to turn off power to other components in module 20, including alarm 36. In other words, alarm 36 does not provide an audible alarm of the off-hook condition if local phone 2 is the offending phone.

Since a different phone from local phone 2 could be causing an off-hook and inactive condition on phone line 18, disconnecting local phone 2 from phone line 18 will not correct the problem. In that event, local override circuit 44 causes impedence detector 42 to reset latching relay 48 thereby reconnecting local phone 2 to phone line 18.

In the embodiment illustrated in FIG. 3, local override circuit 44 operates as follows. When disconnect circuit 38 causes local phone 2 to be electrically connected to impedance detector 42, it also causes local override circuit 44 to impose an additional, temporary load on impedance detector 42, in parallel with the load of local phone 2. After a short time, local override circuit 44 then removes the temporary load, thereby causing the load measured by impedance detector 42 to decrease. If local phone 2 is off hook, the resulting decrease in the load that is sensed by impedence detector 42 will not exceed the preselected amount required to cause a reset of latching relay 48. On the other hand, if local phone 2 is on hook (and thus not contributing significantly to load measured by impedance detector 42), then the resulting decrease in the load that is sensed by impedance detector 42 will exceed the preselected amount required to cause a reset of latching relay 48. In that case, impedance detector 42 responds by resetting latching relay 48 thereby reconnecting local phone 2 to phone line 18.

Note that when the offending phone is not local phone 2, the initial disconnecting of local phone 2 from phone line 18 does not cause the voltage of the line to increase back to 48 volts. Thus, line voltage detector 24 continues to detect the off-hook condition and power to alarm 36 remains on, thereby continuing to alert the user that another phone on phone line 18 is off hook.

Module 20 operates as follows. If local phone 2 is taken off hook, the voltage on line 18 drops below 20 volts and line voltage detector 24 responds by powering up other components in module 20, including tone detector 30 If the off-hook condition persists and, the phone remains inactive, the phone company eventually sends a modulated multi-tone warning signal. Tone detector 30 receives the modulated 2060 Hz component of the warning signal and generates the modulated indication signal. Frequency detector 34 detects the presence of the modulated indication signal and sets latch circuit 34 which, in turn, activates disconnect circuit 38 and alarm 36. When activated, disconnect circuit 38 sets latching relay 40 to disconnect local phone 2 from phone line 18. Line voltage detector 24 immediately senses that the load has been removed from phone line 18 and turns off power to other components in module 20 thereby stopping alarm 36. Ring detector 46 signals any incoming calls even though local phone 2 has been disconnected from phone line 18.

If local phone 2 is not the offending phone, the same sequence of events occurs up to and including the setting of latch relay 40 to disconnect local phone 2 from phone line 18. Since another phone is still loading phone line 18, line voltage detector 24 continues to detect the off-hook condition and thus keeps power on to the other components in module 20, including the alarm 36 which will continue to alert the user. In addition, soon after local phone 2 is disconnected from phone line 18, local override circuit 44 determines that local phone 2 is not in an off-hook condition and causes impedance detector 42 to reset latching relay 40 thereby reconnecting local phone 2 to phone line 18.

Ring detector 46 will signal an incoming call even if the local phone has been disconnected by the latching relay 40. This feature is especially useful in one phone households.

It will be understood that the accessory could be connected to the phone line entering a household with several phones. In this case, if any of the phones is off-hook and inactive, all the phones will be disconnected and the ring detector will detect and signal any incoming calls.

Figure 3:
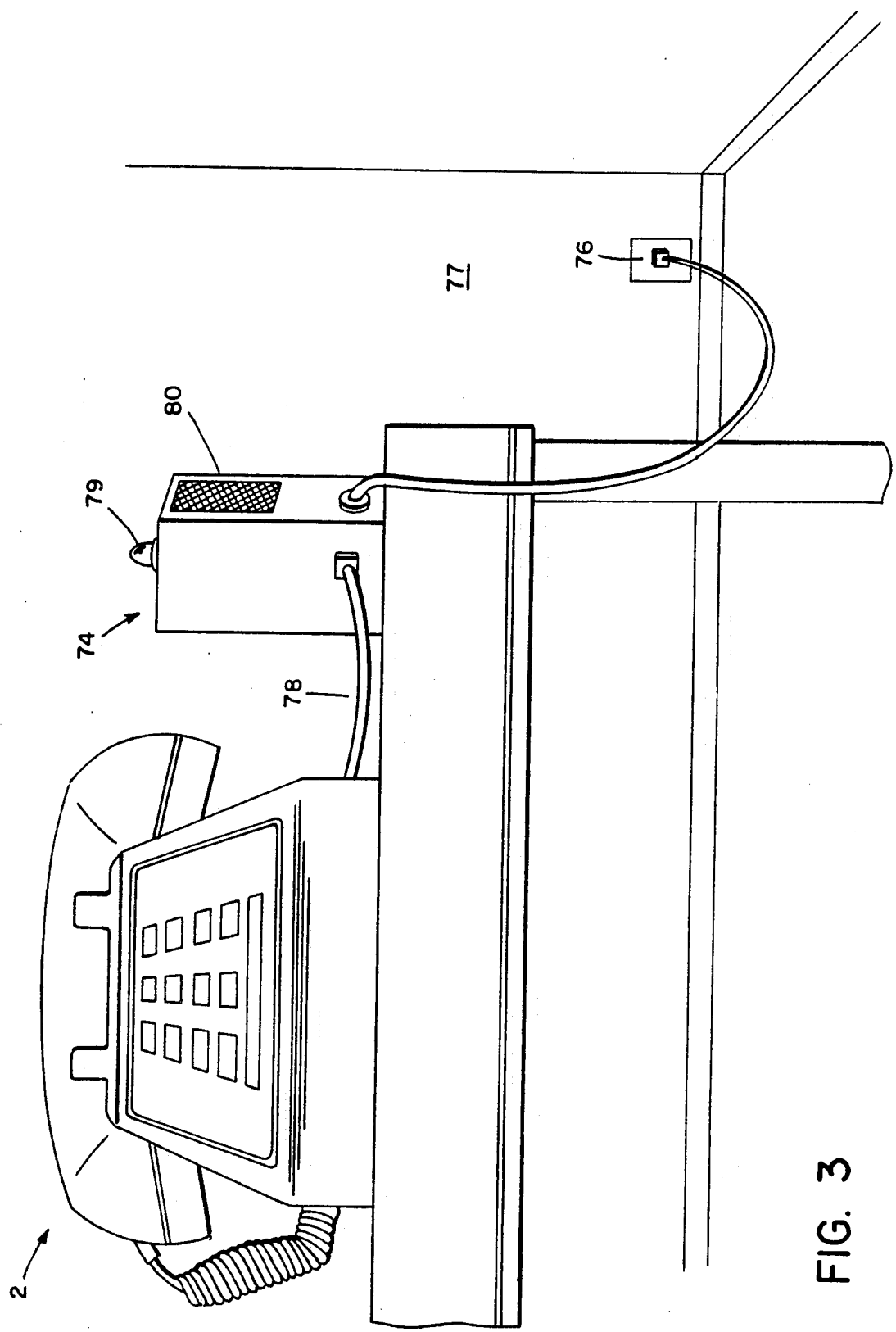
FIG. 3 illustrates an accessory module adapted to be plugged into a phone outlet.

In FIG. 3, the accessory is shown schematically as a module 74, which plugs into a phone jack 76 in a wall 77 of the user's home. The line 78 from the telephone 2 connects to the module 74. The module includes an LED 79 and a speaker 80. It will be understood that the accessory can be provided as an integral component of a telephone.

OTHER EMBODIMENTS

Local phone 2 need not be entirely disconnected from phone line 18. Thus, in another embodiment, which can be incorporated directly into the phone itself, disconnect circuit 38 and latching relay 48 only disconnects from phone line 18 the parts of local phone 2 that are causing the off-hook condition. Thus, for example, the bells in the phone can still remain connected to the phone line 18. In that case, ring detector 46 would not be required to alert the user of the incoming calls.

Figure 4:
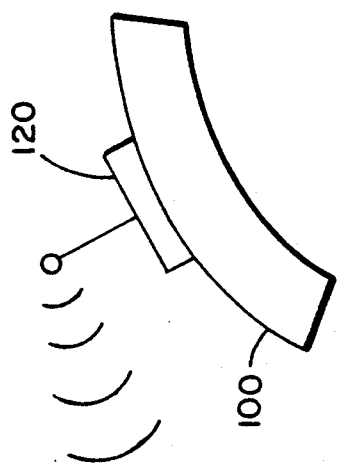
FIG. 4 illustrates an accessory used with a cordless phone.
Figure 4:
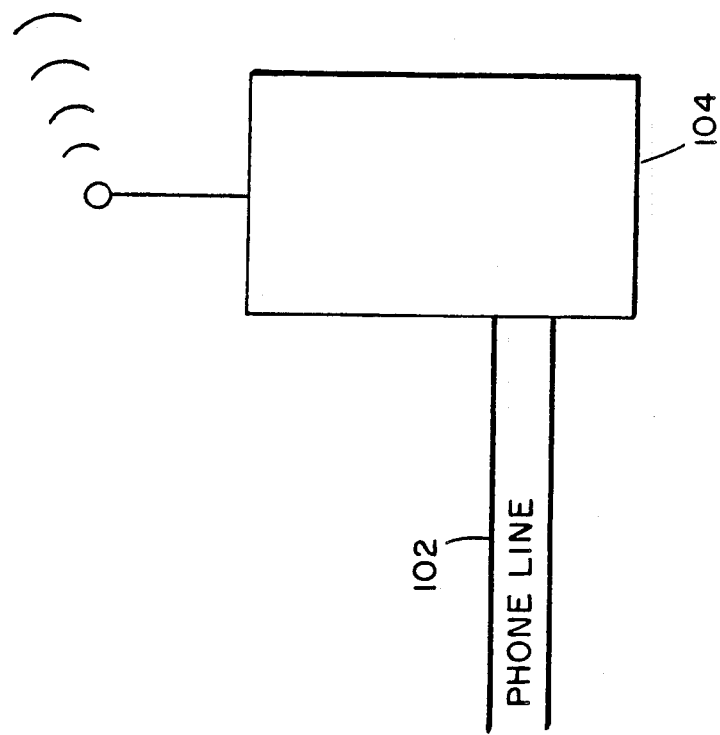

A module 120, which is adapted to be used with a cordless phone 100, is shown in FIG. 4. Generally, cordless phone 100 has a talk mode, in which the phone 100 is electrically connected to phone line 102 through base station 104, and a standby mode, in which base station 104 releases phone line 102 so that phone 100 is no longer electrically connected to phone line 102. In other words, talk mode generates an off-hook condition on phone line 102. If phone 100 is not put into the standby mode, and phone line 102 remains inactive, a warning signal is eventually sent over phone line 102 to base station 104 and base station 104 transmits the warning signal to phone 100. Module 120 is adapted to detect that the cordless phone has not been placed in standby mode and to detect the warning signal. When the warning signal is detected, module 120 forces phone 100 to go into standby mode, which forces base station 104 to disconnect phone 100 from phone line 102.

It will be understood by those skilled in the art that the invention may be practiced otherwise than as described herein.

What is claimed is:

1. An apparatus for use with a telephone that is electrically connected to a phone line, the apparatus comprising:
   a detector for detecting when an off-hook condition exists on said phone line, and
   a disconnect circuit responsive to the off-hook detector for eliminating the off-hook condition when said off-hook condition is caused by said telephone being in an off-hook mode.

2. The apparatus of claim 1 wherein the disconnect circuit electrically disconnects the telephone from the phone line so as to eliminate the off-hook condition caused by the telephone being in an off-hook mode.

3. The apparatus of claim 2 wherein the telephone causes the off-hook condition by adding a load to the phone line and wherein the off-hook detector operates by detecting the presence of the added load on the phone line.

4. The apparatus of claim 3 wherein said disconnect circuit electrically disconnects the telephone from the phone line by disconnecting the load from the phone line.

5. The apparatus of claim 1 wherein the telephone is a cordless phone that is electrically connected to the phone line through a base station, the cordless phone having a talk mode that results in an off-hook condition on the phone line and a standby mode that does not result in an off-hook condition on the phone line, and wherein the disconnect circuit eliminates the off-hook condition by placing the cordless phone in the standby mode.

6. The apparatus of claim 5 wherein the off-hook detector detects that the off-hook condition exists in the phone line by detecting that the cordless phone is in the talk mode.

7. The apparatus of claim 1 wherein the off-hook detector detects the presence of the off-hook condition on the phone line by monitoring a line voltage across said phone line.

8. The apparatus of claim 7 wherein the off-hook detector detects the presence of the off-hook condition on the phone line by determining that the line voltage has dropped below a predetermined threshold.

9. The apparatus of claim 1 wherein the disconnect circuit further comprises a line activity detector for detecting when the phone line is in an inactive off-hook condition.

10. The apparatus of claim 9 wherein a phone system sends a warning signal over the phone line to indicate that the phone line has been in an inactive off-hook condition for a predetermined length of time and wherein the line activity detector detects the warning signal.

11. The apparatus of claim 10 wherein the warning signal includes a plurality of tones and wherein the line activity detector operates by detecting one of said plurality of tones.

12. The apparatus of claim 1 wherein the telephone has an on-hook state and an off-hook state, the off-hook state causing the off-hook condition on the phone line, the apparatus further comprising a testing circuit for detecting when the telephone is in the on-hook state.

13. The apparatus of claim 12 further comprising an override circuit responsive to the testing circuit for resetting said disconnect circuit when the telephone is placed back in the on-hook state.

14. The apparatus of claim 2 further comprising a ring monitor circuit for indicating the presence of an incoming call over the phone line while the phone is disconnected from the phone line.

15. The apparatus of claim 1 further comprising a visual indicator responsive to the off-hook detector for indicating when there is an off-hook condition on the phone line.

16. The apparatus of claim 1 wherein another telephone may be connected to the phone line and wherein the apparatus further comprises an alarm responsive to the off-hook detector for indicating when the off-hook condition is caused by the other telephone 17. The apparatus of claim 1 adapted as a module to be plugged into a phone outlet.

18. An apparatus for use with a telephone that is electrically connected to a phone line, there possibly being another telephone connected to the phone line, the apparatus comprising:
   an off hook detector for detecting when an off-hook condition exists in said phone line,
   a line activity detector responsive to the off-hook detector for determining if the phone line experiencing the off-hook condition is inactive, and
   an alarm responsive to the line activity detector for indicating that the phone line is in an inactive off-hook condition.

19. The apparatus of claim 18 wherein the alarm produces an audible alarm signal.

20. The apparatus of claim 18 wherein the alarm produced a visible alarm signal.

21. The apparatus of claim 18 wherein a phone system sends a warning signal over the phone line to indicate that the phone line has been in an inactive off-hook condition for a predetermined length of time and wherein the line activity detector detects the warning signal.

22. The apparatus of claim 21 wherein the warning signal includes a plurality of tones and wherein the line activity detector operates by detecting one of said plurality of tones.

23. The apparatus of claim 18 further comprising a reset circuit for disabling the alarm if the off-hook condition is caused by the other phone.

24. An apparatus for use with a telephone that is electrically connected to a phone line, the telephone causing an off-hook condition on said phone line when in an off-hook state, the apparatus comprising:
   a detector for detecting when the off-hook condition exists on said phone line, the off-hook detector detecting the presence of the off-hook condition on the phone line by monitoring a line voltage across said phone line,
   a line activity detector responsive to the off-hook detector for detecting when the phone line is in an inactive off hook condition, the line activity detector operating by detecting a warning signal sent by a phone system over the phone line,
   a disconnect circuit responsive to the line activity detector for disconnecting the telephone from the phone line when the inactive off-hook condition is detected,
   a testing circuit for detecting when the telephone is in the on-hook state, and
   an override circuit responsive to the testing circuit for resetting said disconnect circuit when the telephone is placed back in the on-hook state.

25. A method for preventing a telephone from remaining off-hook and inactive comprising:
   detecting a signal sent to said telephone from said system when said telephone is in both an off-hook and inactive condition, and
   producing an signal in response to said off-hook and inactive condition.

26. Method of claim 25 further comprising:
   removing said off-hook condition when said telephone in said off-hook and inactive conditions are detected.

27. Method for preventing a telephone from remaining off-hook and inactive comprising:
   detecting when said telephone is in both an off-hook condition and an inactive condition, and
   removing said off hook condition.

* * * * *

UNITED STATES PATENT AND TRADEMARK OFFICE
CERTIFICATE OF CORRECTION

PATENT NO. : 4,998,271

DATED : March 5, 1991

INVENTOR(S) : Angelo Tortola, et al

It is certified that error appears in the above-identified patent and that said Letters Patent is hereby corrected as shown below:

In the Title: after "TELEPHONE ACCESSORY" insert --FOR DISCONNECTING A TELEPHONE IN AN INADVERTENT OFF-HOOK MODE--.

Column 1, line 17: replace "off hook" with --off-hook--.
          line 17: replace "off hook" with --off-hook--.
          line 21: replace "off hook" with --off-hook--.
          line 26: replace "subscribers" with --subscriber's--.

Column 7, line 22: replace "off hook" with --off-hook--.

Column 8, line 15: replace "off hook" with --off-hook--.

Signed and Sealed this

First Day of December, 1992

Attest:

DOUGLAS B. COMER

Attesting Officer      Acting Commissioner of Patents and Trademarks